US011824602B2

(12) United States Patent
Cox

(10) Patent No.: US 11,824,602 B2
(45) Date of Patent: *Nov. 21, 2023

(54) SYSTEM TO ACQUIRE CHANNEL STATE INFORMATION FOR MULTIPLE-INPUT AND MULTIPLE-OUTPUT SYSTEMS

(71) Applicant: Photonic Systems, Inc., Billerica, MA (US)

(72) Inventor: Charles H. Cox, Carlisle, MA (US)

(73) Assignee: Photonic Systems, Inc., Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/962,743

(22) PCT Filed: Jan. 16, 2019

(86) PCT No.: PCT/US2019/013772
§ 371 (c)(1),
(2) Date: Jul. 16, 2020

(87) PCT Pub. No.: WO2019/143667
PCT Pub. Date: Jul. 25, 2019

(65) Prior Publication Data
US 2020/0358485 A1    Nov. 12, 2020

Related U.S. Application Data

(60) Provisional application No. 62/619,693, filed on Jan. 19, 2018.

(51) Int. Cl.
*H04B 7/04*    (2017.01)
*H04B 7/0417*    (2017.01)
(Continued)

(52) U.S. Cl.
CPC ......... *H04B 7/0417* (2013.01); *H04B 7/0421* (2013.01); *H04B 7/0626* (2013.01); *H04L 5/143* (2013.01); *H04L 5/1438* (2013.01)

(58) Field of Classification Search
CPC .. H04B 7/0417; H04B 7/0421; H04B 7/0626; H04L 5/0048; H04L 5/143; H04L 5/1438
See application file for complete search history.

(56) References Cited

U.S. PATENT DOCUMENTS 9,209,840 B2    12/2015 Cox
2014/0128008 A1    5/2014 Cox et al.
(Continued)

FOREIGN PATENT DOCUMENTS

EP    3741045 A1    11/2020
WO    2015/095843 A1    6/2015
(Continued)

OTHER PUBLICATIONS

"Notification of Transmittal of the International Search Report and the Written Opinion of the International Searching Authority, or the Declaration" for International Patent Application No. PCT/US2019/013772, dated May 1, 2019, 11 pages, International Searching Authority/KR, Daejeon, Republic of Korea.
(Continued)

*Primary Examiner* — Nader Bolourchi
(74) *Attorney, Agent, or Firm* — Rauschenbach Patent Law Group, PLLC; Kurt Rauschenbach

(57) ABSTRACT

A multiple-input multiple output transmit and receive system includes a first antenna that transmits a first signal at a channel frequency that propagates in a first path and that simultaneously receives a pilot signal at the channel frequency with the transmitting the first signal at the channel frequency, where the pilot signal propagates in a second path. A single-channel duplex transmit-receive system is
(Continued)

coupled to an output of the first antenna. A processor is coupled to an output of the single-channel duplex transmit-receive system and configured to determine channel state information of the first path at the channel frequency using the received pilot signal.

9 Claims, 6 Drawing Sheets

(51) Int. Cl.
  *H04L 5/14* (2006.01)
  *H04B 7/06* (2006.01)

(56) References Cited

U.S. PATENT DOCUMENTS

| | | | |
|---|---|---|---|
| 2015/0055525 | A1 | 2/2015 | Ma et al. |
| 2015/0244436 | A1 | 8/2015 | Le-Ngoc et al. |
| 2016/0119850 | A1* | 4/2016 | Kimura ............ H04W 24/10 370/332 |
| 2016/0285534 | A1 | 9/2016 | Li et al. |
| 2016/0315749 | A1 | 10/2016 | Liang |
| 2017/0034837 | A1 | 2/2017 | Lopez-Perez et al. |
| 2017/0331526 | A1* | 11/2017 | Liang ............... H04B 7/0617 |
| 2018/0084523 | A1* | 3/2018 | Uchiyama ............ H04W 88/04 |
| 2018/0167191 | A1* | 6/2018 | Liang ................ H04L 5/14 |
| 2019/0229779 | A1 | 7/2019 | Cox |

FOREIGN PATENT DOCUMENTS

| | | |
|---|---|---|
| WO | 2017003966 A1 | 1/2017 |
| WO | 2019/143667 A1 | 7/2019 |

OTHER PUBLICATIONS

"Office Action" for U.S. Appl. No. 16/249,390, dated Oct. 1, 2019, 26 pages, US Patent and Trademark Office, Alexandria, VA.

"Notice of Allowance" for U.S. Appl. No. 16/249,390, dated Jun. 23, 2020, 20 pages, US Patent and Trademark Office, Alexandria, VA.

"Notification Concerning Transmittal of International Preliminary Report on Patentability (Chapter I of the Patent Cooperation Treaty)" for International Patent Application No. PCT/US2019/013772, dated Jul. 30, 2020, 8 pages, Geneva, Switzerland.

Manchon et al., "Ping-Ping Beam Training with Hybrid Digital-Analog Antenna Arrays", IEEE ICC, Wireless Communications Symposium, 2017, 7 pages.

Extended European Search Report received for EP Patent Application No. 19740729.9, dated Sep. 20, 2021, 7 pages.

* cited by examiner

SYSTEM TO ACQUIRE CHANNEL STATE INFORMATION FOR MULTIPLE-INPUT AND MULTIPLE-OUTPUT SYSTEMS

CROSS REFERENCE TO RELATED APPLICATIONS

The present application is a 35 U.S.C. § 371 application based on International Patent Application No. PCT/US19/13772, filed on Jan. 16, 2019, entitled "System to Acquire Channel State Information for Multiple-Input and Multiple-Output Systems," which claims priority to U.S. Provisional Patent Application No. 62/619,693, entitled "System to Acquire Channel State Information for Multiple-Input and Multiple-Output Systems" filed on Jan. 19, 2018. The entire contents of International Patent Application No. PCT/US19/13772 and U.S. Provisional Patent Application No. 62/619,693 are herein incorporated by reference. The present application is also related to U.S. patent application Ser. No. 16/249,390.

The section headings used herein are for organizational purposes only and should not be construed as limiting the subject matter described in the present application in any way.

INTRODUCTION

Spatial multiplexing that can be achieved with multi-user, massive, multiple-input multiple-output (MIMO) provides a much needed increase in the capacity of communications systems without the need for additional spectrum. One challenge for implementing massive MIMO systems on a wide scale is to realize these systems using a frequency-division duplexing (FDD) scheme rather than the less common time division duplexing (TDD) scheme. Such systems are expected to be much simpler and more practical to deploy. Thus, technology solutions are needed to provide simple, scalable means to support FDD wireless networking using massive MIMO array antennas.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

DESCRIPTION OF VARIOUS EMBODIMENTS

Figure 1:
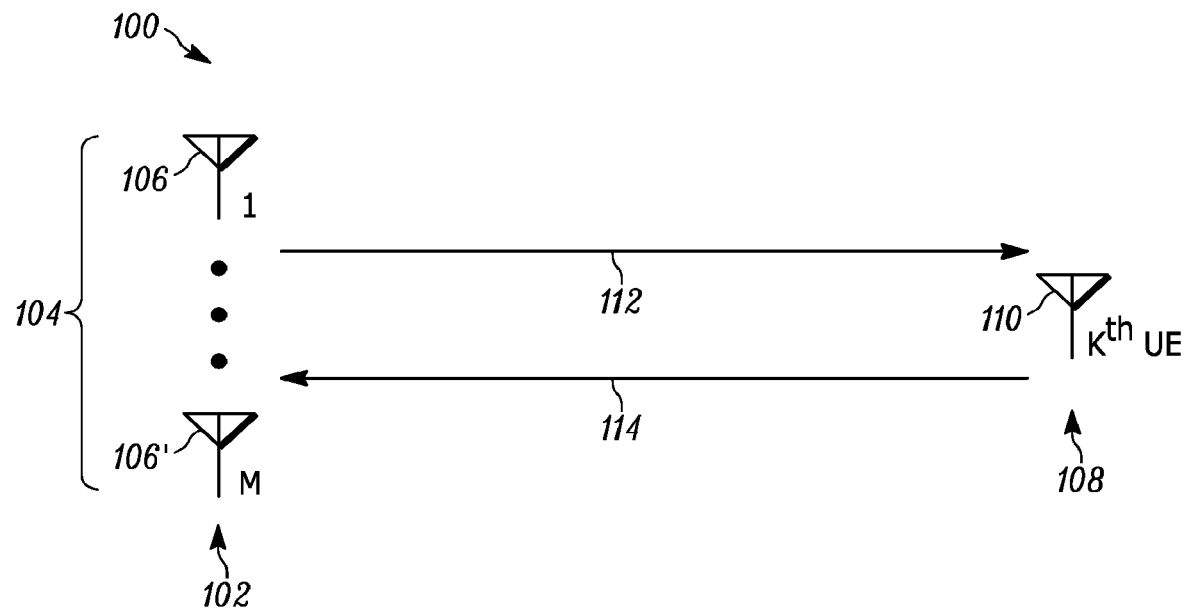
FIG. 1 illustrates a block diagram of a basic configuration of a single-cell of a multi-user, massive MIMO system.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings may be performed in any order and/or simultaneously as long as the teaching remains operable. Furthermore, it should be understood that the apparatus and methods of the present teachings can include any number or all of the described embodiments as long as the teaching remains operable.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

One of the important aspects to implementing massive multiple-input multiple-output (MIMO) antenna arrays is the need to determine, and update the channel state information (CSI) of the channel that will be used for massive MIMO operation. The CSI depends on the frequency of the channel being used. Except in limited special cases, measurement of the CSI in one frequency channel cannot be used for massive MIMO in another frequency channel. This presents a challenge to implementing massive MIMO. If a system uses a time-division duplexing (TDD) signaling format, then both the down-link, which is also referred to as the forward-link, and the up-link, which is also referred to as the reverse-link, operate on the same frequency channel. Hence CSI measurements made on the uplink can be used for massive MIMO operation on the downlink since a channel is reciprocal. The reciprocity of a channel operating in opposite directions at a same frequency is well known in the art.

To implement massive MIMO in a frequency division duplexing (FDD) signaling format presently requires some undesirable tradeoffs. In some methods, the CSI is determined by transmitting signals from the massive MIMO array to the user equipment, which may include a single antenna at the user end of the channel. In these methods of determining CSI, in order to enable the single antenna at the user end of the channel to distinguish the signals coming from each element of the massive MIMO array, one needs to transmit orthogonal waveforms from each of the massive MIMO array elements. As the number of elements in the massive MIMO array increases, this approach rapidly becomes cumbersome and expensive to implement. Clearly, a system with the massive scale of so-called "massive" MIMO, with many antenna elements, is challenged by this scaling factor.

A second method of determining the CSI is to modify the user equipment so that, when in the mode of acquiring the CSI, it can transmit on the frequency channel that it normally uses for receiving. A method using this approach is disclosed by Lianag and Zhu, in PCT Publication No. WO 2015/095843 A1, which is entitled "Method for Acquiring Channel State Information in FDD MIMO Wireless Networks". This method uses switching to enable transmitting in what is normally a receive band and vice versa. Because the CSI needs to be updated often, e.g. every few milliseconds in some applications, it would be highly desirable if the method for transmitting in the normal receive band did not require such switching.

Consequently, one aspect of the present teaching to provide a means for acquiring the CSI in an FDD signal format that does not require switching at the user equipment. Another aspect of the present teaching is to provide such a capability in a manner whose complexity is independent of the number of elements in the massive MIMO array. Yet another aspect of the present teaching is to provide this capability in a manner that does not require any modification to the user equipment.

The present teaching is now described in connection with determining the CSI in a multi-user, massive MIMO system using a FDD format in a cellular wireless communications network. FIG. 1 illustrates the basic configuration of a single cell 100 of a cellular wireless communications network. The base station (BS) 102 has the massive MIMO array 104, which has M antenna elements 106, 106', and supports K remote users that have user equipment (UE) 108, each of which has a single-element antenna 110. FIG. 1 illustrates only the $k^{th}$ user's user equipment 108. Signals are conveyed from the BS 102 to the UEs, including the $k^{th}$ user's user equipment 108 over a down-link (DL) 112, which is also referred to as a forward-link. Signals are conveyed from the UEs, including the $k^{th}$ user's user equipment 108, to the BS 102 over an up-link (UL) 114, which is also referred to as a reverse-link. In embodiments that use the FDD format the DL 112 and UL 114 are simultaneously operating on different channels that are at different frequencies. Conversely in embodiments that use the TDD format, the DL 112 and UL 114 are conveyed at different times on the same frequency channel. One known benefit of MIMO arrays 104 is that they can generate directional beam patterns that increase the capacity of wireless system, such as cellular communication systems. This generation of directional beam patterns is often referred to as beamforming. That is, two or more antennas in the array 104 are controlled, typically via phase and/or amplitude control, to generate directed beams. The ability to control the relative phases and/or amplitudes of the antenna elements to generate a directed beam through a channel path is dependent on knowledge of the CSI.

Figure 2A:
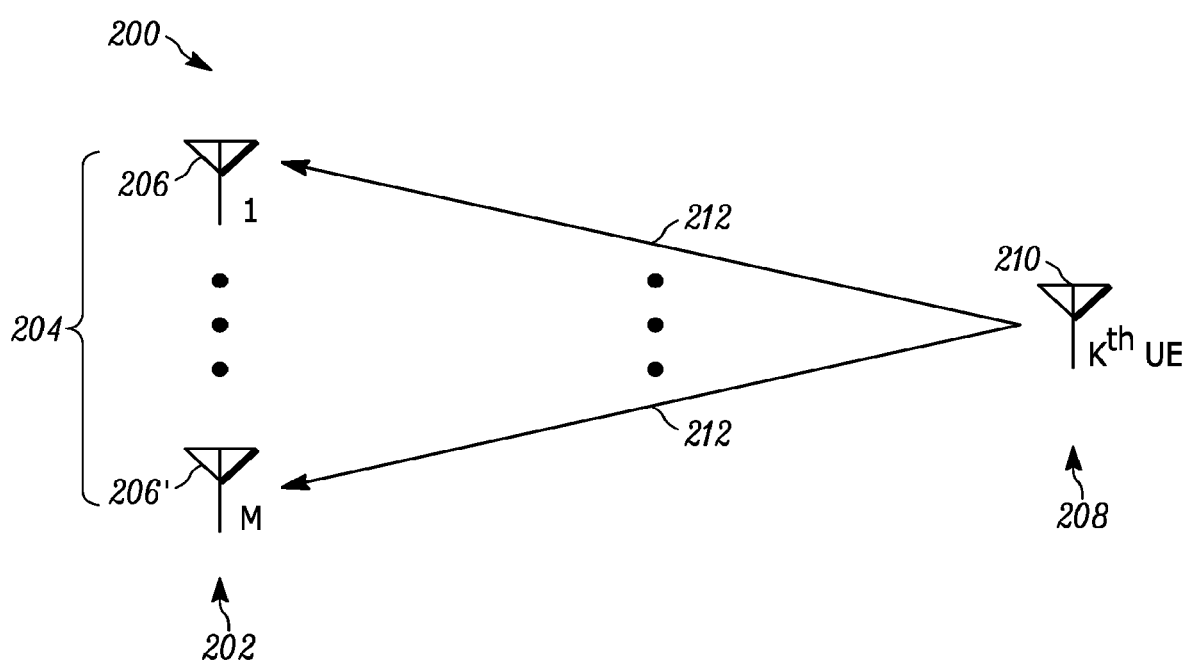
FIG. 2A illustrates a known method for determining the channel state information (CSI) of a system using a time division duplexing (TDD) format.
Figure 2B:
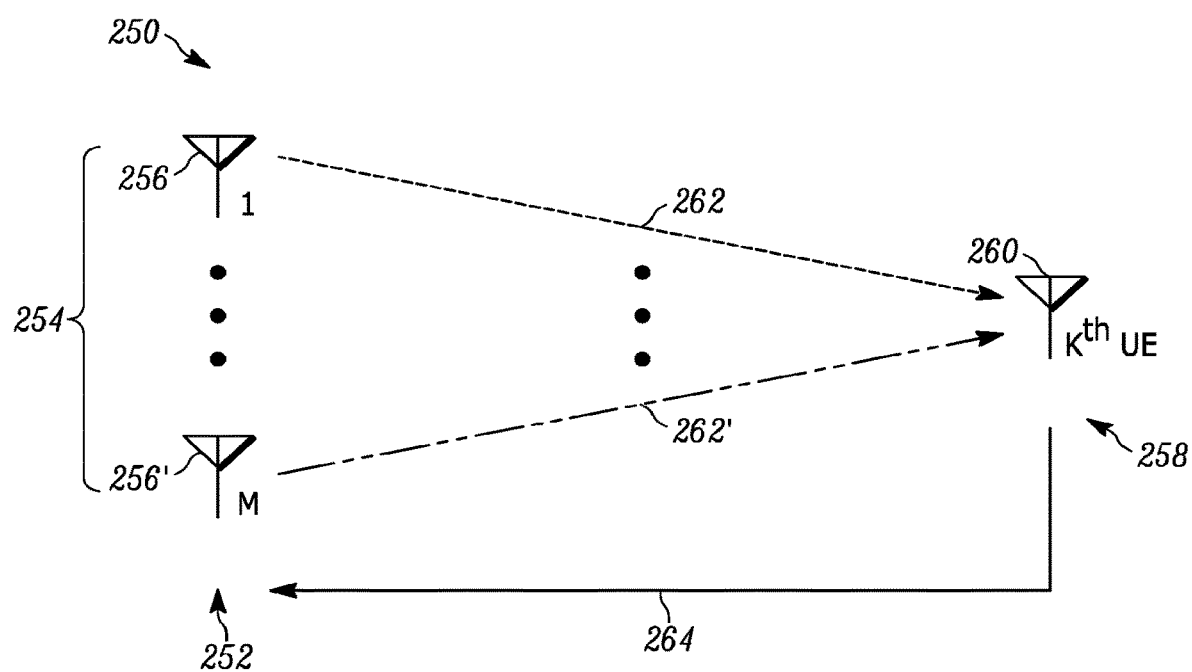
FIG. 2B illustrates a known method for determining the channel state information of a system using a frequency division duplexing (FDD) format.

FIGS. 2A-B illustrate known methods for determining the DL CSI in both TDD and FDD signal formats. The TDD MIMO system 200 of FIG. 2A includes a base station 202 with an antenna array 204 that includes multiple antenna elements 206, 206'. User equipment (UE) 208 of the $k^{th}$ user includes a single antenna element 210. In the TDD system 200, the UE 208 emits a single, known signal, called a pilot signal 212, which is received by each of the M elements 206, 206' of the massive MIMO array 204 at the base station 202.

The magnitude and phase information at each of the elements 206, 206' constitutes the CSI for the up-link from the $k^{th}$ user. Assuming that the channel state is constant, which it is over a period that is referred to as the coherence time, reciprocity guarantees that the DL CSI is equal to the UL CSI.

The FDD MIMO system 250 of FIG. 2B includes a base station 252, with an antenna array 254 that includes multiple antenna elements 256, 256'. User equipment 258 of the $k^{th}$ user includes a single antenna element 260. In the FDD system 250, the BS 252 transmits pilot signals 262, 262' to the antenna element 260 of the UE 258 of the $k^{th}$ user, one pilot signal 262, 262' from each of the M elements. Since there is only a single antenna element 260 at the UE 258, the pilot signals 262, 262' transmitted by the BS 252 need to be mutually orthogonal, so that the UE 258 can determine the magnitude and phase of each of the M individual pilot signals 262, 262' from the BS 252. The determined magnitude and phase of each of the M individual pilot signals 262, 262' from the BS 252 corresponds to the DL CSI. The UE 258 then communicates the DL CSI back up to the BS 252 over a control channel 264. As the number of elements 256, 256' in the BS array 254 increases, the number of orthogonal pilot signals 262, 262' also increases, which means that this approach quickly becomes cumbersome and expensive to implement.

Furthermore, the burden of isolating the M individual pilot signals 262, 262' from the aggregate signal received by the UE antenna element 260 and calculating the CSI from these M pilot signals 262, 262' increases the signal processing that needs to be performed by the UE 258. This increased signal processing is highly undesirable. These constraints have led some to conclude that attempting to implement massive MIMO under an FDD signal format is not practical. For example, Dr. Thomas Marzetta, who is widely recognized as the inventor of massive MIMO, has stated publically that: "Massive MIMO with FDD is a disaster, end of story" See, R. Nichols, "Massive MIMO: Answering Some common Questions," Keysight Technologies White Paper.

To determine the DL CSI without experiencing the growth in the number of orthogonal pilot signals requires that the UE be able to transmit in the frequency channel it normally uses to receive. Known methods of accomplishing this have involved switching between what are normally the receive and the transmit paths in the UE. See, for example, Lianag and Zhu, PCT Publication No. WO 2015/095843 A1 entitled "Method for Acquiring Channel State Information in FDD MIMO Wireless Networks".

One feature of the present teaching is that the method to determine the CSI does not involve any switching at the UE, nor does it require the use of multiple, orthogonal pilot signals. Instead, hardware is used at the UE that enable the UE to return to the BS the same, single pilot signal that was transmitted by the BS. Returning the same pilot signal to the BS basically enables CSI determination under FDD to be the same as under TDD. Several embodiments of an apparatus and method to acquire the CSI for a FDD MIMO System whereby the UE returns at least a portion of the pilot signal originating in the BS back to the BS are described below.

There are two basic classes of methods of generating and radiating a pilot signal from the UE to the BS, depending on whether any modifications need to be made to the UE to enable it to radiate a signal in the down-link frequency band. In a conventional FDD format, the UE can only receive a signal in the down-link band. If the UE can be modified to transmit in the down-link frequency band, then either of two, non-switching-based embodiments of the method of the present teaching may be used.

The first method uses a single channel duplexing-compatible (SCD-compatible) UE to originate and transmit a pilot signal to an SCD-compatible BS. Single channel duplexing is described further below. The second method is similar to the first method, except that a BS modified to be SCD-compatible originates and transmits a pilot signal to an SCD-compatible UE, which in turn re-transmits the pilot signal to the BS. If the UE cannot be modified to transmit in the down-link frequency band, then a third method is used.

The third method is similar to the second method in that an SCD-compatible BS transmits a pilot signal. However, in the third method, the BS transmits this pilot signal to an unmodified UE, which in turn re-radiates the pilot signal back to the BS, using antenna reflection technology to re-radiate the pilot signal received by the UE antenna. The term "radiate" is used herein to denote a passive form of transmission, i.e. one that does not involve active components, such as amplifiers, to generate the signal to be radiated by an antenna.

All three methods require that at least the BS, and, for the first and second methods the UE as well, be compatible with a new format we refer to as single channel duplexing, SCD. As the SCD name implies, only a single frequency channel is used to convey, simultaneously, signals between the BS and UE. Single channel duplexing is made possible by utilizing a recently developed technology that is called Simultaneous Transmit and Receive, STAR. See, for example, U.S. Pat. No. 9,209,840 and U.S. Patent Publication No. US 2014/0128008, either of which enables just such a capability.

There are several options for incorporating the single channel duplexing technology of the present teaching into known FDD systems. In a first embodiment, a known two-frequency-channel FDD is completely replaced with the single-frequency-channel SCD format. Since all communication between BS and UE is over a single frequency channel, when massive MIMO operation is needed it is relatively straightforward to have the UE send a pilot signal on the up-link to the BS, which can calculate the CSI and, by channel reciprocity, apply the measured CSI to convey the desired down-link information. Such an apparatus is associated with the first embodiment of the method described above.

A second, less radical, embodiment of the apparatus of the present teaching maintains the known two-frequency-channel FDD with no modification to the up-link. In this embodiment of the apparatus, however, the down-link is modified to include single channel duplexing technology at both the BS and the UE such that the BS is able to send a pilot signal on the down-link while simultaneously receiving the pilot signal that is sent back up from the UE to the BS on the same down-link frequency channel. This embodiment of the apparatus is associated with the second embodiment of the method described above.

The third embodiment of the apparatus of the present teaching uses the known, two-frequency-channel FDD with no modification to the up-link. In this apparatus, however, only the BS is modified with single channel duplexing technology; the UE is completely unmodified from its normal prior-art, two-frequency-channel FDD operation. This embodiment of the apparatus is associated with the third method described herein.

Examples of these three apparatus and methods are described below in greater detail. The embodiment of the system and method of the present teaching illustrated in FIG. 3 determines the downlink CSI using a single-channel duplex signaling format. The SCD-compatible MIMO system 300 of FIG. 3 includes a base station 302, with an antenna array 304 that includes multiple antenna elements 306, 306'. User equipment 308 of the $k^{th}$ user is also single channel duplexing compatible and includes a single antenna element 310. The pilot signal 312 is originated and sent by the SCD-compatible UE 308 to an SCD-compatible BS 302. Each element 306, 306' in the BS antenna array 304 measures the magnitude and relative phase of the pilot signal it receives from each of the K UEs, including the UE 308 of the $k^{th}$ user that the BS 302 is supporting. In the example illustrated in FIG. 3, only the $k^{th}$ of K UEs is shown, although the BS 302 may support many users.

Figure 3:
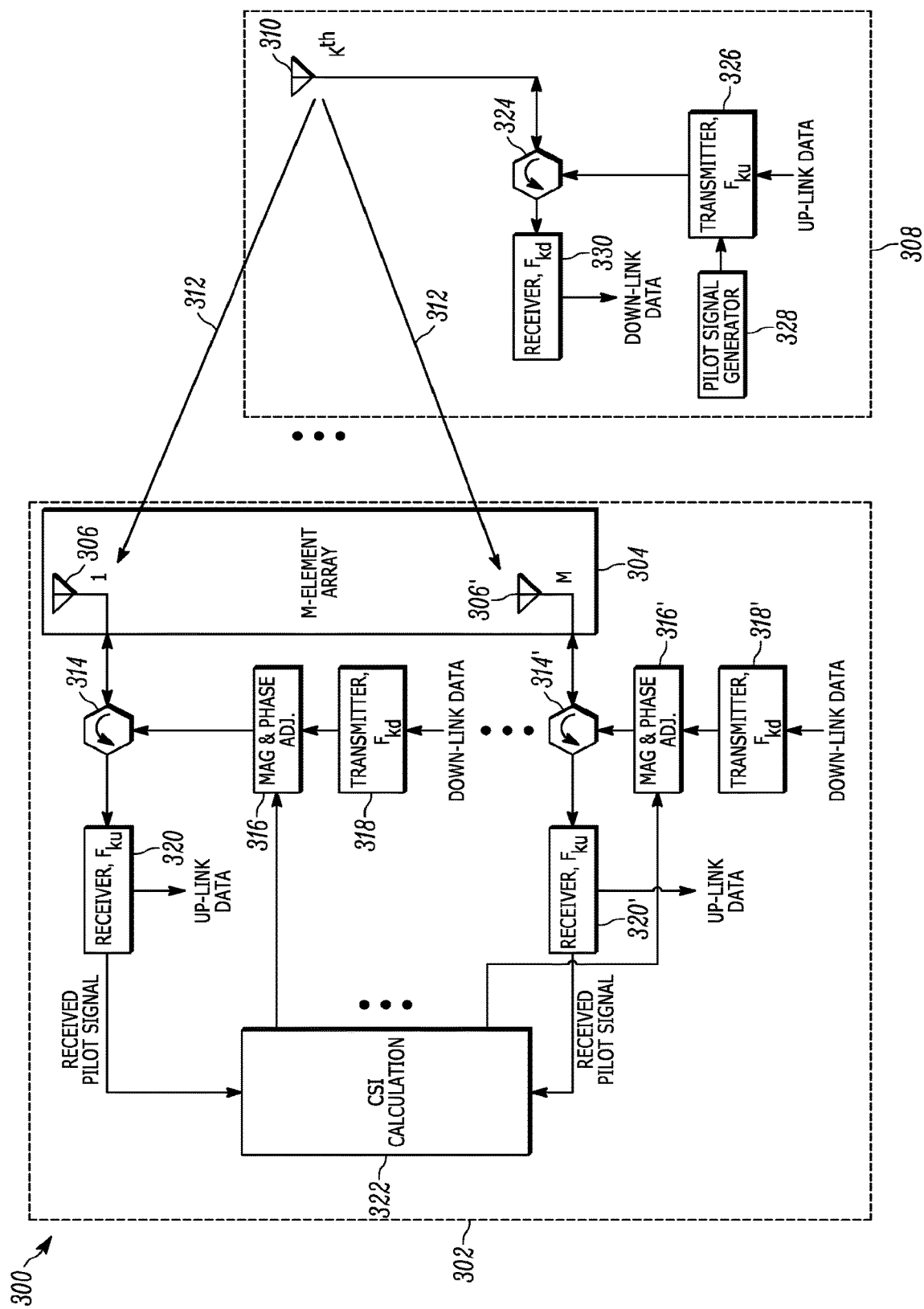
FIG. 3 illustrates a block diagram of an embodiment of a method for determining the downlink channel state information that uses a single-channel duplex (SCD) signaling format of the present teaching.

To enable the BS to separately process the pilot signals that are returning simultaneously from multiple UEs, the BS may apply codes or other forms of modulation to each of the pilot signals for each UE. To enhance the ability of the BS to separately process the multiple pilot signals, the codes or other forms of modulation may be orthogonal among the K user pilot signals. From these measurements at the BS antenna array 304, the BS 302 calculates the up-link CSI between the UE and the BS. Since with an SCD signaling format, both up- and down-links are on the same frequency channel, we can invoke channel reciprocity to equate the measured up-link CSI with the desired down-link CSI. Hence, the magnitudes and phases determined by the channel state calculation are applied to each of the M elements 306, 306' of the MIMO array at a convenient point in the transmit path as shown in FIG. 3. Thus, each element is provided a magnitude and/or phase that are based on the CSI in order to form a directed beam. In various embodiments, various numbers of the M elements are used to form a particular directed beam for that particular down link.

The BS 302 includes a single channel duplexing transmit-receive system 314, 314' each with a port that connects to a respective antenna element 306, 306'. An input port of the single channel duplexing transmit-receive system 314, 314' is connected to a respective output of a magnitude and phase adjustment circuit 316, 316'. The magnitude phase adjustment circuits 316, 316' are each driven by respective transmitter circuits 318, 318' that provide the down-link data and provide a transmit signal at a frequency, $f_{kd}$, which is a down-link frequency for the $k^{th}$ user. An output port of the SCD transmit-receive system 314, 314' is connected to respective receivers 320, 320' that determine up-link data from the received signal at $f_{ku}$, which is the up-link frequency for the $k^{th}$ user. The receivers 320, 320' also provide at an output the received pilot signal from the $k^{th}$ user that is input to a processor 322 that performs a CSI calculation. The processor 322 may be analog or digital or both and may include an electrical circuit or microprocessor. Not shown are inputs to the processor 322 from the other elements of the array, that are similarly connected using the same back end electronics as shown for the two arrays, 1, M. The processor 322 includes an output for each element 306, 306' that provides a magnitude and phase value to the magnitude and phase adjustment circuit 316, 316' of each element.

In some embodiments, the SCD transmit-receive system 314, 314' is the same SCD transmit-receive system disclosed in U.S. Provisional Patent Application Ser. No. 62/563,613, entitled Single-Channel, Full-Duplex Wireless Signal Transmission System, which is assigned to the present assignee. The entire contents of U.S. Provisional Patent Application Ser. No. 62/563,613 are incorporated herein by reference. The SCD transmit-receive system 314, 314' simultaneously transmits and receives on the same frequency channel and using a single antenna element 306, 306'. Thus, in some embodiments, $f_{ku}=f_{kd}$, and/or the uplink frequency channel is the same as the downlink frequency channel, and/or the up-link frequency band is the same as the downlink frequency band. Because the single channel duplexing transmit-receive system 314, 314' can simultaneously transmit and receive using a same channel frequency, that is, transmit a channel frequency at the same time it receives the same channel frequency, $f_{ku}$ is equal to $f_{kd}$. As such, the processor 322 can calculate the CSI that is used to provide the phase and/or magnitude adjustments to some or all of the antennas 306, 306' to form the multi-antenna array 304 down-link beam, where the CSI calculation is based on received up-link signal sent by the UE 308.

At the UE 308 of the $k^{th}$ user, the antenna element 310 is connected to a port of a SCD transmit-receive system 324. An input port of the SCD transmit-receive system 324 is connected to a transmitter circuit 326 that takes in the up-link data and provides a transmit signal at a frequency, $f_{ku}$, which is the up-link frequency for the $k^{th}$ user. The transmitter circuit 326 is also connected to a pilot signal generator 328 that generates the pilot signal sent by the $k^{th}$ user to the array 304. An output port of the SCD transmit-receive system 324 is connected to a receiver 330 that determines down-link data from the received signal at $f_{kd}$, which is the down-link frequency for the $k^{th}$ user. Again, $f_{ku}=f_{kd}$, and/or the uplink frequency channel is the same as the downlink frequency channel. Thus, the pilot signal sent by the $k^{th}$ user is also using this same frequency channel. In a typical system, this process is going on simultaneously for the K users covered by the BS 302, with each user occupying a separate up-link channel, $f_{ku}$, and down-link channel, $f_{kd}$. That is, $f_{iu} \ne f_{ju}$, $f_{iu}=f_{id}$, $f_{ju}=f_{jd}$.

Note that in FIG. 3, at the BS 302, one array antenna 304 is shown both receiving signals from, and transmitting signals to, the UE. One skilled in the art will appreciate that this is only one particular embodiment and not necessary to practice the present teachings. Many methods according to the present teaching will work well if two array antennas were used—one for receiving signals from, and a second for transmitting signals to, the UE.

This method shares similarities with known methods that determine the CSI in a TDD signaling format. For example, in both the known methods and the method of the present teaching, the UE originates and transmits a pilot signal to the BS, from which the BS calculates the up-link CSI that, because of channel reciprocity, equals the desired down-link CSI. While SCD has in common with TDD the use of the same frequency channel for both up- and down-links, the TDD system uses that channel at different times for up and down link, while the channel is used simultaneously with SCD. Thus, for example, a TDD system would send uplink information on a particular channel frequency in one time slot, and send downlink information on that same channel frequency in a different, non-overlapping, time slot. The SCD system of the present teaching sends uplink information on a particular channel frequency in one time slot, and is simultaneously sending downlink information on that same channel frequency in that same time slot. This leads to a potential of nominally double the bandwidth using SCD as compared to known FDD approaches.

Figure 4:
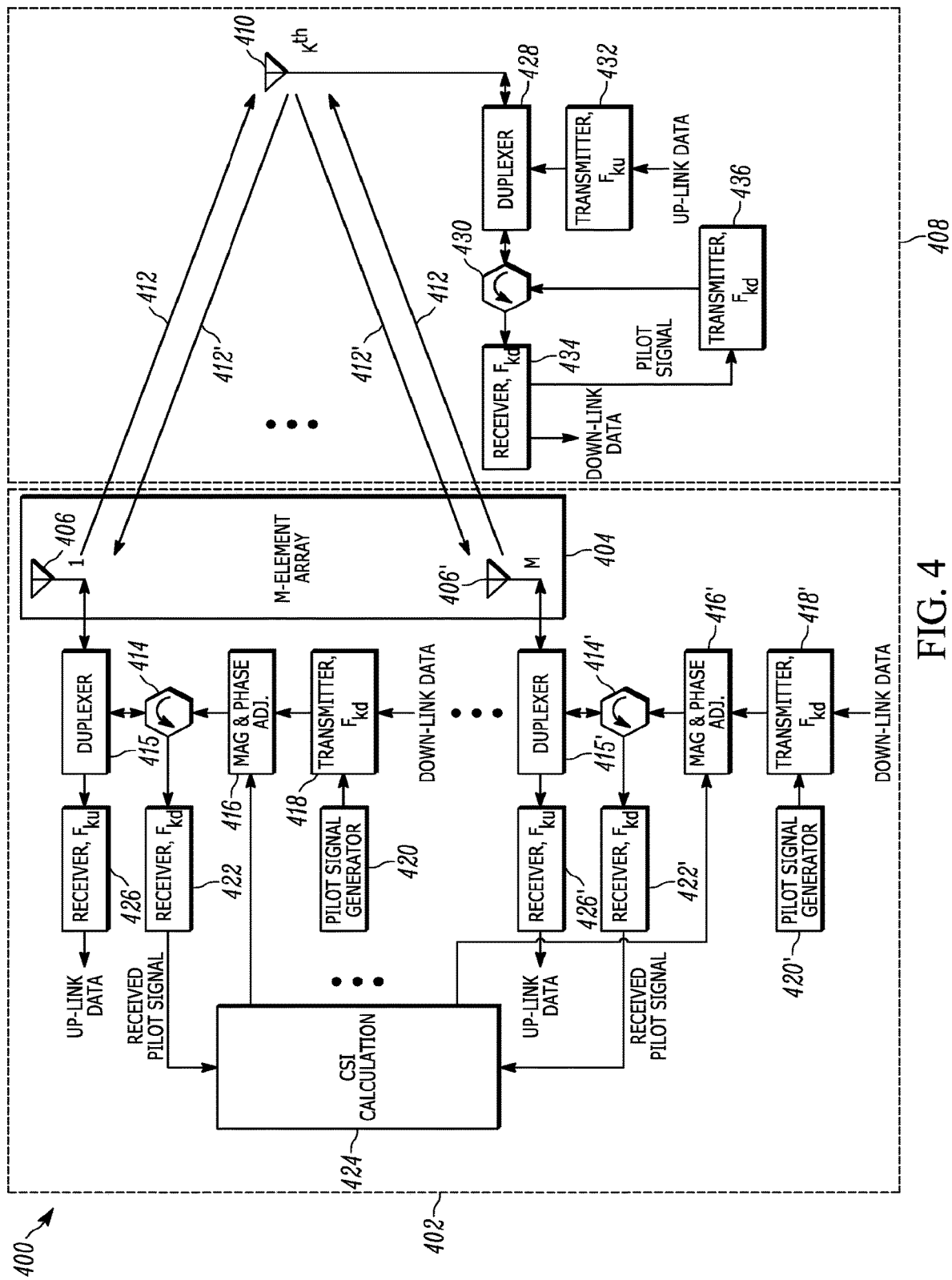
FIG. 4 illustrates a block diagram of another embodiment of a method for determining the downlink channel state information that uses a single-channel duplex (SCD) signaling format of the present teaching.

Another embodiment of the system and method of the present teaching illustrated in FIG. 4 determines the down-link CSI using a modified form of a known, two-frequency-channel (FDD) signaling format, which we call down-link-SCD. In down-link SCD-compatible MIMO system 400 illustrated in FIG. 4, the downlink CSI is determined by using an SCD signaling format in which the pilot signal is originated and sent on what is conventionally the exclusively down-link frequency channel by an SCD-compatible BS 402 to a down-link, SCD-compatible UE 408 and the UE 408 re-transmits the pilot signal to the BS 402 using the same, down-link frequency channel. The up-link data is conveyed from UE 408 to BS 402 on the conventional up-link frequency channel.

The down-link SCD-compatible MIMO system 400 of FIG. 4 includes a base station 402, with an antenna array 404 that includes multiple antenna elements 406, 406'. User equipment 408 of the $k^{th}$ user is also SCD compatible and includes a single antenna element 410. The pilot signal is originated and sent by the SCD-compatible BS 402 to an SCD-compatible UE 408 using a downlink 412. The UE 408 includes an antenna element 410 and generates uplink signals 412' that are sent to the BS 402. The pilot signal is retransmitted to the BS 402 on uplink 412'.

The BS 402 includes a SCD transmit-receive system 414, 414' each with a bidirectional port that connects to a duplexer 415, 415'. The duplexer 415, 415' is connected to a respective antenna element 406, 406' with a bidirectional port. An input port of the SCD transmit-receive system 414, 414' is connected to a respective output of a magnitude and phase adjustment circuit 416, 416'. The magnitude and phase adjustment circuits 416, 416' are each driven by respective transmitter circuits 418, 418' that provide the down-link data and provide a transmit signal at a frequency, $f_{kd}$, which is a down-link frequency for the $k^{th}$ user. The transmitter circuits 418, 418' are also connected to a pilot signal generators 420, 420' that generate a pilot signal sent to the $k^{th}$ user. The $k^{th}$ user retransmits the pilot signal back to the BS 402. One output port of each of the SCD transmit-receive systems 414, 414' is connected to respective receivers 422, 422' that receive the pilot signal at $f_{kd}$, which is the downlink frequency for the $k^{th}$ user. This received pilot signal was retransmitted from the $k^{th}$ user.

The receivers 422, 422' also provide at an output the received pilot signal retransmitted from the $k^{th}$ user that is input to a processor 424 that performs a CSI calculation. The processor 424 may be analog or digital or both and may include an electrical circuit or microprocessor. Not shown are inputs to the processor 424 from the other elements of the array, that are similarly connected using the same back end electronics as shown for the two arrays, 1, M. The processor 424 includes an output for each element 406, 406' that provides a magnitude and phase value to the magnitude and phase adjustment circuit 416, 416' of each element.

An output port of each of the duplexers 415, 415' is connected to a receiver 426, 426' that determines up-link data from the received signal at $f_{ku}$, which is the up-link frequency for the $k^{th}$ user.

At the UE 408 of the $k^{th}$ user, the antenna element 410 is connected to a bidirectional port of a duplexer 428. An SCD transmit-receive system 430 is connected to another bidirectional port of the duplexer 428. An input port of the duplexer 428 is connected to a transmitter circuit 432 that takes in the up-link data and provides a transmit signal at a frequency, $f_{ku}$, which is the up-link frequency for the $k^{th}$ user. An output port of the SCD transmit-receive system 430 is connected to a receiver 434 that determines down-link data from the received signal at $f_{kd}$, which is the down-link frequency for the $k^{th}$ user. The receiver 434 also has an output that provides the pilot signal, derived from the downlink signal, to a transmitter 436 that is used to retransmit the pilot signal at $f_{kd}$ to the BS 402 using the antenna element 410. In a typical system, this process is going on simultaneously for the K users covered by the BS 402, with each user occupying a separate up- and down-link channel. In the example illustrated in FIG. 4 only the $k^{th}$ UE 408 is shown, although the BS 402 may support many users.

In some embodiments, the SCD transmit-receive system 414, 414', 430 is the same SCD transmit-receive system disclosed in U.S. Provisional Patent Application Ser. No. 62/563,613, entitled Single-Channel, Full-Duplex Wireless Signal Transmission System, which is assigned to the present assignee. The SCD transmit-receive system 414, 414', 430 simultaneously transmits and receives on the same frequency channel and using a single antenna element 406, 406', 410. Thus, in some embodiments, $f_{ku}=f_{kd}$, and/or the uplink frequency channel is the same as the downlink frequency channel, and/or the up-link frequency band is the same as the downlink frequency band.

Note that in FIG. 4 at the BS 402, one array antenna 404 is shown both receiving signals from, and transmitting signals to, the UE 408. One skilled in the art will appreciate that this is not essential to the operation of the apparatus. The system would work well if two array antennas were used—one for receiving signals from, and a second for transmitting signals to, the UE 408.

The system and method illustrated in FIG. 4 addresses situations where it would be desirable for the BS to originate the pilot signal rather than the UE, as was the case in the embodiment illustrated in FIG. 3. In the embodiment of the system and method illustrated in FIG. 4, the CSI that is actually measured is the round-trip CSI, i.e. the combination of the down-link CSI and the up-link CSI, which are equal by reciprocity since both links are on the same frequency channel. As is well known in the signal processing art, it is possible under these conditions to determine the one-way CSI from the round-trip CSI.

The block diagram of the embodiment illustrated in FIG. 4 is similar to the block diagram of the embodiment illustrated in FIG. 3 with three exceptions. First, the pilot signal generator 420, 420' has been moved from the UE to the BS. Second, the output of the pilot signal received by the UE receiver 434 is fed to the UE transmitter 436. Hence, when the UE 408 receives a pilot signal from the BS 402, it is configured to re-transmit the pilot signal back up to the BS 402. Third, the up-link data, as opposed to the up-link pilot signal, is sent on a separate frequency channel, as in prior art FDD signal formats. Otherwise, the operation of the embodiment of the method of FIG. 4 proceeds in the same manner as the embodiment illustrated in FIG. 3.

Implementing the third method, i.e. not modifying the UE, would seem to pose a pair of irreconcilable design constraints. First, there is the need for the UE to transmit in what is normally the down-link frequency channel. Second, there is the fact that an unmodified UE cannot transmit in the down-link frequency channel. However, to resolve this conundrum, we use a little known fact about antennas that a perfectly matched antenna re-radiates back into space half the RF power that is incident upon it. See, for example, J. D. Kraus, Antennas, McGraw Hill, New York, 1950, FIG. 3-2(b), pgs. 42-46. Using this known reflection property of matched antennas allows the pilot signal to be reflected back to the antenna for subsequent calculation of the CSI to provide a massive MIMO system using FDD of the present teaching. One important aspect of the present teaching is to use this physical phenomenon of antennas to configure the UE antenna to radiate a signal that can be used to measure the CSI. Here we use the term "radiate" to denote a passive form of transmission, i.e. one that does not involve active components, such as amplifiers, to generate the signal to be radiated by an antenna.

Figure 5:
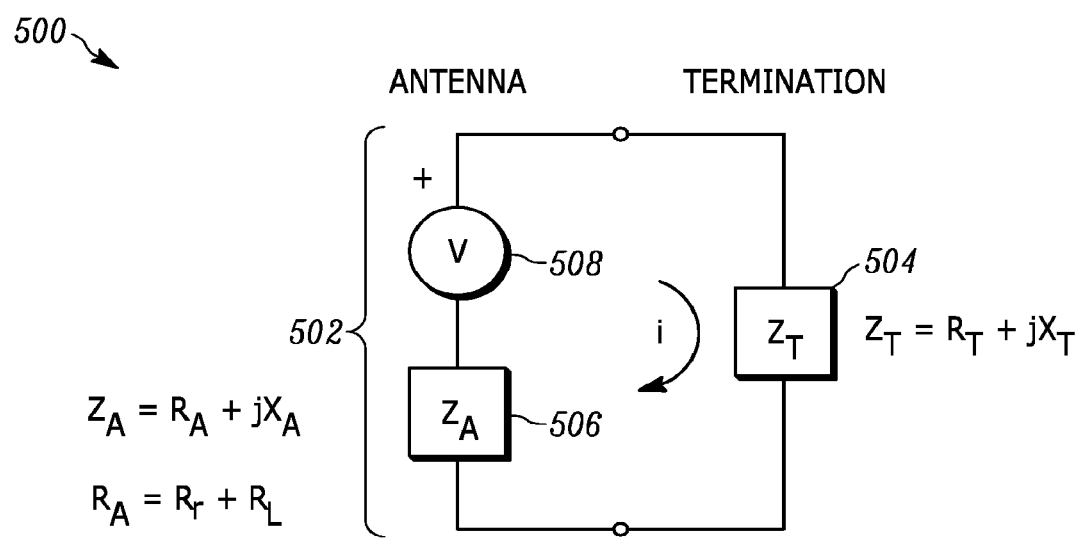
FIG. 5 illustrates an embodiment of a lumped-element equivalent circuit of an antenna connected to a complex load impedance, $Z_T$.

FIG. 5 illustrates an embodiment of a lumped-element equivalent circuit 500 of an antenna equivalent circuit 502 connected to a complex load impedance 504, $Z_T$, that is conjugately matched to the antenna impedance 506, $Z_A$. To appreciate the basis for the system and method of the present teaching, the circuit in FIG. 5 shows a schematic diagram of an antenna connected to a termination. The antenna is represented by its Thevenin equivalent circuit 502, which includes of a voltage source 508 connected in series with a complex impedance 506, $Z_A$. The antenna impedance 506 includes a resistance, $R_A$ and a reactance, $X_A$. The resistance $R_A$ is a radiation resistance $R_r$ and a loss resistance $R_L$. The loss resistance represents the ohmic loss of the conductors in the antenna. Since this loss resistance is typically small, we can neglect this term in estimations. The termination impedance 504 can also be broken into a resistance $R_T$ and a reactance $X_T$. A common technique is to have the termination be a conjugate match to the antenna, i.e. to make $R_L=R_A$ and $X_L=-jX_A$. Under the conjugate match condition, the power delivered to the termination resistance is $i^2 R_T$. Since the antenna radiation resistance equals the termination resistance, the power delivered to the termination resistance is equal to the power dissipated by the antenna radiation resistance. This is the known maximum power transfer result stipulating that when the termination resistance equals the source resistance, equal powers are dissipated by the source and termination resistances. In the case of the antenna, the question is: where does the power dissipated by the radiation resistance go? The answer is that it is radiated back out into space. Hence an antenna terminated by a matched load re-radiates half the power it receives back into space.

One feature of the present teaching is that it is possible to generate the pilot signal and determine the CSI at the base station without needing any modifications in the user equipment. That is, in some embodiments of the present teaching, the apparatus can use existing cell-phones, which makes this particular solution cost effective.

Figure 6:
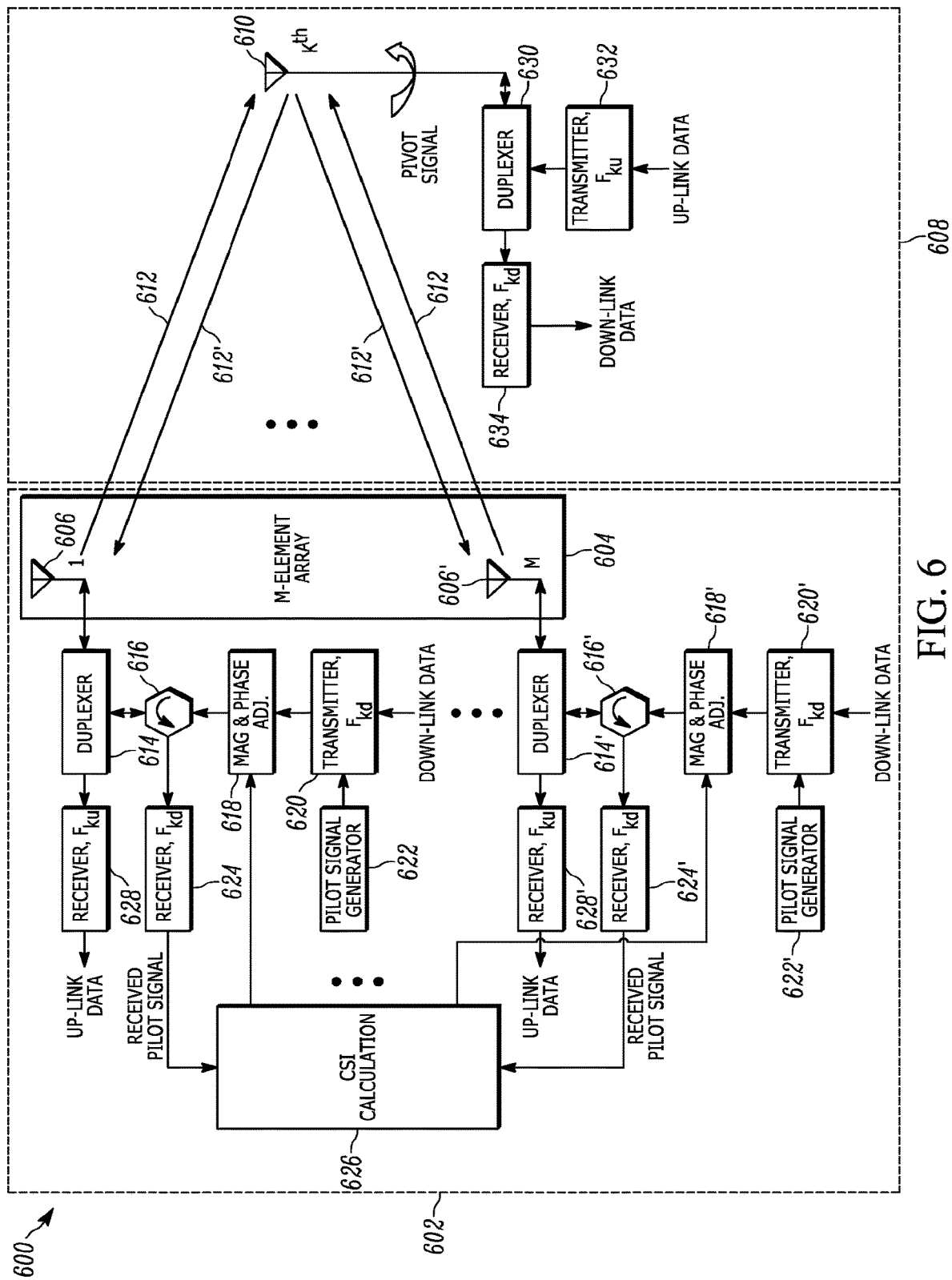
FIG. 6 illustrates a block diagram of another embodiment of a method for determining the downlink channel state information that uses a single-channel duplex (SCD) signaling format of the present teaching.

FIG. 6 illustrates a configuration of a base station and user equipment that can use re-radiation to achieve radiation from an unmodified UE in the down-link frequency channel. The BS transmits a pilot signal on a frequency channel that is normally used by the UE to receive, i.e. the BS transmits on a UE down-link channel. The UE antenna receives this signal, and since it is connected to a matched termination, it re-radiates half the power of the signal it detects from the BS back to the BS. Once the pilot signal is detected, the process proceeds in a manner similar to that used in the other embodiments to determine the CSI of the down-link.

The re-radiated signal travels back to the BS antenna, where it is detected by each of the M antenna elements in the BS array antenna. By measuring the magnitude and relative phase of the detected pilot signal, the BS can establish the CSI of the up-link from the UE to the BS. By reciprocity, the CSI of the down-link equals the CSI of the up-link. The magnitudes and phases determined by the channel state calculation are applied to each of the M elements of the MIMO array at a convenient point in the transmit path as shown in FIG. 6.

Implicit to realizing the system and method of the present teaching is the need for the BS to be able to simultaneously transmit a signal to, and receive the reflected signal from, the UE. These signals occupy the same frequency at the same time, and therefore, the BS needs to be an SCD-compatible BS.

FIG. 6 illustrates an embodiment of a system and method for acquiring CSI for and FDD massive MIMO system in which the UE returns to the BS the pilot signal generated by the BS using antenna reflection technology. Like the embodiment of FIG. 4, the embodiment of FIG. 6 enables the return of the pilot signal to be on the same frequency that was used to send the pilot signal down to the UE. The advantage of the embodiment of FIG. 6 is that it does not require any modification of the UE.

The SCD-compatible MIMO system 600 of FIG. 6 includes a base station 602 with an antenna array 604 that includes multiple antenna elements 606, 606'. User equipment 608 of the $k^{th}$ user is not modified, and may be an existing cell phone or other wireless device that is not modified to be SCD-compatible. The UE 608 includes a single antenna element 610. The pilot signal is originated and sent by the SCD-compatible BS 602 to an existing UE 608 using a downlink 612. The pilot signal is reflected from the antenna 610 and sent back to the BS 602 on uplink 612'.

The BS 602 includes a duplexer 614, 614' that is connected to a respective antenna element 606, 606' with a bidirectional port. The duplexer 614, 614' is connected to a SCD transmit-receive system 616, 616' with a bidirectional port. An input port of the SCD transmit-receive system 616, 616' is connected to a respective output of a magnitude and phase adjustment circuit 618, 618'. The magnitude and phase adjustment circuits 618, 618' are each driven by respective transmitter circuits 620, 620' that provide the down-link data and provide a transmit signal at a frequency, $f_{kd}$, which is a down-link frequency for the $k^{th}$ user. The transmitter circuits 620, 620' are also connected to pilot signal generators 622, 622' which each generate a pilot signal sent to the $k^{th}$ user. The $k^{th}$ user antenna 610 reflects the pilot signal back to the BS 602. One output port of each of the SCD transmit-receive systems 616, 616' is connected to respective receivers 624, 624' that receive the pilot signal at $f_{kd}$, which is the downlink frequency for the $k^{th}$ user.

The receivers 624, 624' also provide at an output the received pilot signal retransmitted from the $k^{th}$ user that is input to a processor 626 that performs a CSI calculation. The processor 626 may be analog or digital or a combination of analog and digital and may include an electrical circuit or microprocessor. Not shown are inputs to the processor 626 from the other elements of the array, that are similarly connected using the same back end electronics as shown for the two arrays, 1, M. The processor 626 includes an output for each antenna element 606, 606' that provides a magnitude and phase value to the magnitude and phase adjustment circuit 618, 618' of each element.

An output port of each of the duplexers 614, 614' is connected to a receiver 628, 628' that determines up-link data from the received signal at $f_{ku}$, which is the up-link frequency for the $k^{th}$ user.

At the UE 608 of the $k^{th}$ user, the antenna element 610 is connected to a bidirectional port of a duplexer 630. An input port of the duplexer 630 is connected to a transmitter circuit 632 that takes in the up-link data and provides a transmit signal at a frequency, $f_{ku}$, which is the up-link frequency for the $k^{th}$ user. An output port of the duplexer 630 is connected to a receiver 634 that determines down-link data from the received signal at $f_{kd}$, which is the down-link frequency for the $k^{th}$ user. In a typical system, this process is going on simultaneously for the K users covered by the BS 602, with each user occupying a separate up- and down-link channel. In the example illustrated in FIG. 6, only the $k^{th}$ UE 608 is shown, although the BS 602 may support many users.

In some embodiments, the SCD transmit-receive system 616, 616' is the same SCD transmit-receive system disclosed in U.S. Provisional Patent Application Ser. No. 62/563,613, entitled Single-Channel, Full-Duplex Wireless Signal Transmission System, which is assigned to the present assignee. The SCD transmit-receive system 616, 616' simultaneously transmits and receives on the same frequency channel and using a single antenna element 606, 606'. The passively-reflected pilot signal has the same frequency as the incident pilot signal, which means that the uplink frequency for the pilot signal is the same as the down-link frequency pilot signal. The up-link for the uplink data is on a different frequency channel, as in known FDD signal format systems.

Note that in FIG. 6 at the BS 602, one array antenna 604 is shown both receiving signals from, and transmitting signals to, the UE 608. This is not essential to the system. The system would work equally well if two array antennas were used—one for receiving signals from, and a second for transmitting signals to, the UE.

The system and method of the present teaching provides an upgrade path for FDD networks to move to massive MIMO-based technologies. Known systems for massive MIMO do not work well with FDD, in large part because the required channel state information is not available or cumbersome to obtain using prior-art methods as discussed above. By using single-channel duplex transmit and receive systems in the base station alone or in the base station and an end-user, a system that uses and FDD signaling format can be compatible with a massive MIMO transmit and/or receive base station. This combination can double the multiplexing factor available on massive MIMO systems. Specifically, without massive MIMO or SCD, future cellular systems would exhibit no multiplexing factor. Consequently, the number of channels needed to support ten user equipment systems would be ten for TDD, and 20 for FDD. In contrast, with massive MIMO using a TDD technology, the number of channels needed to support ten user equipment systems would be one for TDD. That leads to a massive MIMO multiplexing factor of ten. Just adding SCD to a FDD system, with no massive MIMO provides a multiplexing factor of two. That is, the number of channels needed to support ten user equipment systems is ten, rather than twenty. The combination of massive MIMO and SCD together provides a multiplexing factor of twenty. That is, the number of channels needed to support ten user equipment systems is one for an FDD format. This is the same factor available for a TDD format using both massive MIMO and SCD in which the number of channels needed to support ten user equipment systems is one.

The use of SCD transmit receive also opens up the use of un-paired spectrum for FDD. FDD without SCD transmit and receive systems requires that the uplink and downlink bands be paired. New and legacy frequency bands are often un-paired. By including SCD transmit and receive systems the up-link and downlink frequencies can be the same. Therefore, spectrum no longer needs to be paired. This opens up much more available spectrum for FDD format systems.

Equivalents

While the Applicant's teaching is described in conjunction with various embodiments, it is not intended that the Applicant's teaching be limited to such embodiments. On the contrary, the Applicant's teaching encompass various alternatives, modifications, and equivalents, as will be appreciated by those of skill in the art, which may be made therein without departing from the spirit and scope of the teaching.

What is claimed is:

1. A multiple-input multiple output transmit and receive system comprising:
   a) a first antenna that transmits a first signal at a channel frequency and a pilot signal that propagate in a first path and that receives a re-radiated pilot signal propagating in a second path at the channel frequency simultaneously with the transmitting the first signal at the channel frequency, wherein the first signal is received by a second antenna coupled to the first path and the pilot signal is re-radiated by the second antenna coupled to the second path to generate the re-radiated pilot signal;
   b) a single-channel duplex transmit-receive system coupled to an output of the first antenna; and
   c) a processor coupled to an output of the single-channel duplex transmit-receive system and configured to determine channel state information of the first path at the channel frequency using the received re-radiated pilot signal.

2. The multiple-input multiple output transmit and receive system of claim 1 further comprising a user equipment comprising the second antenna.

3. The multiple-input multiple output transmit and receive system of claim 1 wherein the first signal path is a forward signal path and the second signal path is a reverse signal path.

4. The multiple-input multiple output transmit and receive system of claim 1 wherein the first signal path is downlink and the second signal path is an uplink.

5. The multiple-input multiple output transmit and receive system of claim 1 wherein the first and second signal paths are reciprocal signal paths.

6. The multiple-input multiple output transmit and receive system of claim 1 wherein the first antenna resides in a cellular base station.

7. The multiple-input multiple output transmit and receive system of claim 1 further comprising a user equipment comprising the second antenna and configured to receive the first signal from the first signal path.

8. The multiple-input multiple output transmit and receive system of claim 7 wherein the user equipment comprises a cell phone.

9. The multiple-input multiple output transmit and receive system of claim 7 wherein the user equipment comprises a cellular wireless device.

* * * * *